United States Patent
Fujiwara

(10) Patent No.: US 6,992,788 B2
(45) Date of Patent: Jan. 31, 2006

(54) IMAGE PROCESSING APPARATUS AND METHOD, AND STORAGE MEDIUM

(75) Inventor: Takafumi Fujiwara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 879 days.

(21) Appl. No.: 09/927,539

(22) Filed: Aug. 13, 2001

(65) Prior Publication Data

US 2002/0054342 A1    May 9, 2002

(30) Foreign Application Priority Data

Aug. 22, 2000   (JP)   ............................. 2000-251293

(51) Int. Cl.
*G06F 15/00* (2006.01)
*G06K 1/00* (2006.01)

(52) U.S. Cl. ............... 358/1.15; 358/1.1; 358/1.16; 358/426.01; 358/426.13; 358/426.14; 382/232; 382/239; 382/250

(58) Field of Classification Search ............. 382/232, 382/239, 250; 358/1.16, 426.01, 426.13, 358/426.14, 1.1
See application file for complete search history.

(56) References Cited

U.S. PATENT DOCUMENTS

| | | | | |
|---|---|---|---|---|
| 5,014,198 A | * | 5/1991 | Umemura | 382/232 |
| 5,187,755 A | * | 2/1993 | Aragaki | 382/239 |
| 5,768,481 A | * | 6/1998 | Chan et al. | 358/1.2 |
| 5,838,823 A | * | 11/1998 | Ancessi | 382/232 |
| 5,930,387 A | * | 7/1999 | Chan et al. | 382/166 |
| 6,301,394 B1 | * | 10/2001 | Trout | 382/244 |

* cited by examiner

*Primary Examiner*—Edward Coles
*Assistant Examiner*—Yixing Qin
(74) *Attorney, Agent, or Firm*—Fitzpatrick, Cella, Harper & Scinto

(57) ABSTRACT

The present invention efficiently compresses image data, and stores and manages the compressed data. Image data is compressed in tile unit having predetermined pixels and data packing is performed. The compressed data is compared with compressed data of a preceding packet. If these compressed data are different, the packet data is stored in a memory, and an entry address of the compressed data is stored in a packet table. Meanwhile, if the compressed data is equal to the compressed data of the preceding packet, the compressed data is not stored, but an entry address of the compressed data of the preceding packet is stored in a record of interest in the packet table, and a flag indicative of repetition of the preceding address is set in the packet of interest.

21 Claims, 7 Drawing Sheets

IMAGE PROCESSING APPARATUS AND METHOD, AND STORAGE MEDIUM

FIELD OF THE INVENTION

The present invention relates to an image processing apparatus and method as well as a storage medium for compressing and storing image data.

BACKGROUND OF THE INVENTION

Conventionally, for managing image data divided in packet unit and stored in a memory, a header is provided to the packet for writing information regarding the length of the packet, and the packet data is arranged in a given order. Therefore, as long as reading/writing is performed in the given order, the header information is correctly read/written by virtue of the header information. Moreover, for randomly accessing the packet, a packet table having addresses of stored packets is used.

Generally speaking, in a case of image data printed by a printer, a portion not including characters is blank, thus having no data. Such blank portion often takes up a large proportion of the page. When image data for a page is divided into packets and managed, many packets include pixels for the blank portion. As a result, a large number of packets having exactly the same data take up a large proportion of the memory.

SUMMARY OF THE INVENTION

The present invention has been proposed in consideration of the conventional problem, and has as its object to provide an image processing apparatus and method as well as a storage medium, which enable effective compression of image data, storage and management of the data.

In order to solve the above problem, for instance, the image processing apparatus according to the present invention has the following configuration.

More specifically, the present invention provides an image processing apparatus for compressing and storing image data, comprising: division means for dividing the image data into a pixel block, which is a group of a predetermined number of pixels; generation means for compressing the data in the pixel block unit and sequentially generating packet data; packet table storage means for storing, as a packet table, a storage address of packet data corresponding to each pixel block subjected to division by the division means; and storage control means for storing packet data of interest generated by the generation means and a storage address of the packet data of interest in the packet table when the packet data of interest is different from preceding packet data, whereas when the packet data of interest is equal to the preceding packet data, not storing the packet data of interest, but storing in the packet table a storage address of the preceding packet data as a storage address of the packet data of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
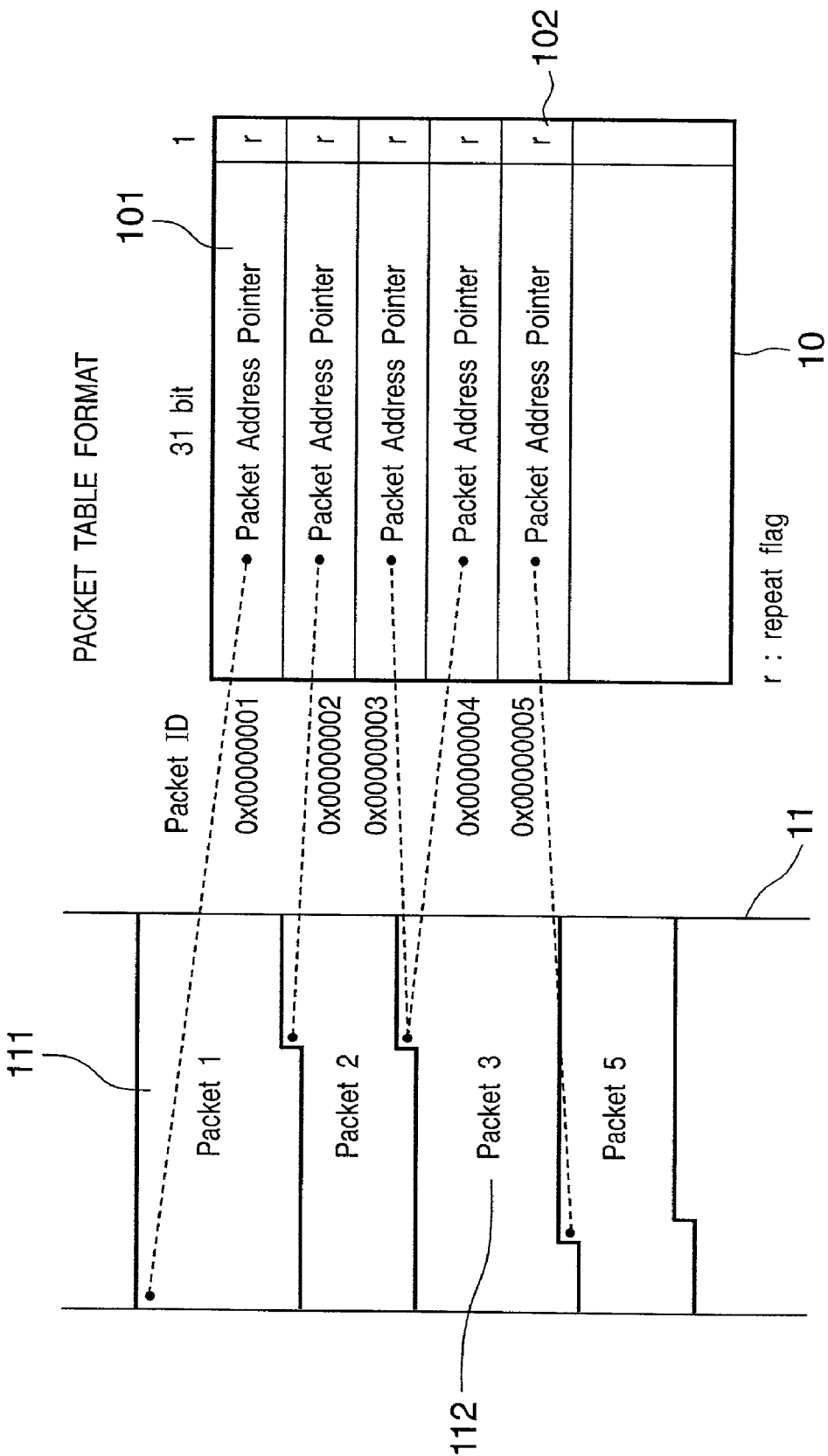
FIG. 1 is a view showing a packet table according to a first embodiment of the present invention.

FIG. 1 shows a relationship between packet data and a packet table according to a first embodiment of the present invention.

In FIG. 1, reference numeral 10 denotes a packet table indicating a starting address 101 of each packet in the memory. Reference numeral 102 denotes a repeat flag, which is set ON if data is the same as the data of the preceding packet, but is set OFF if data is different from the preceding packet. Reference numeral 11 denotes a packet data area set in the memory, which is schematically shown in the drawing.

Figure 2:
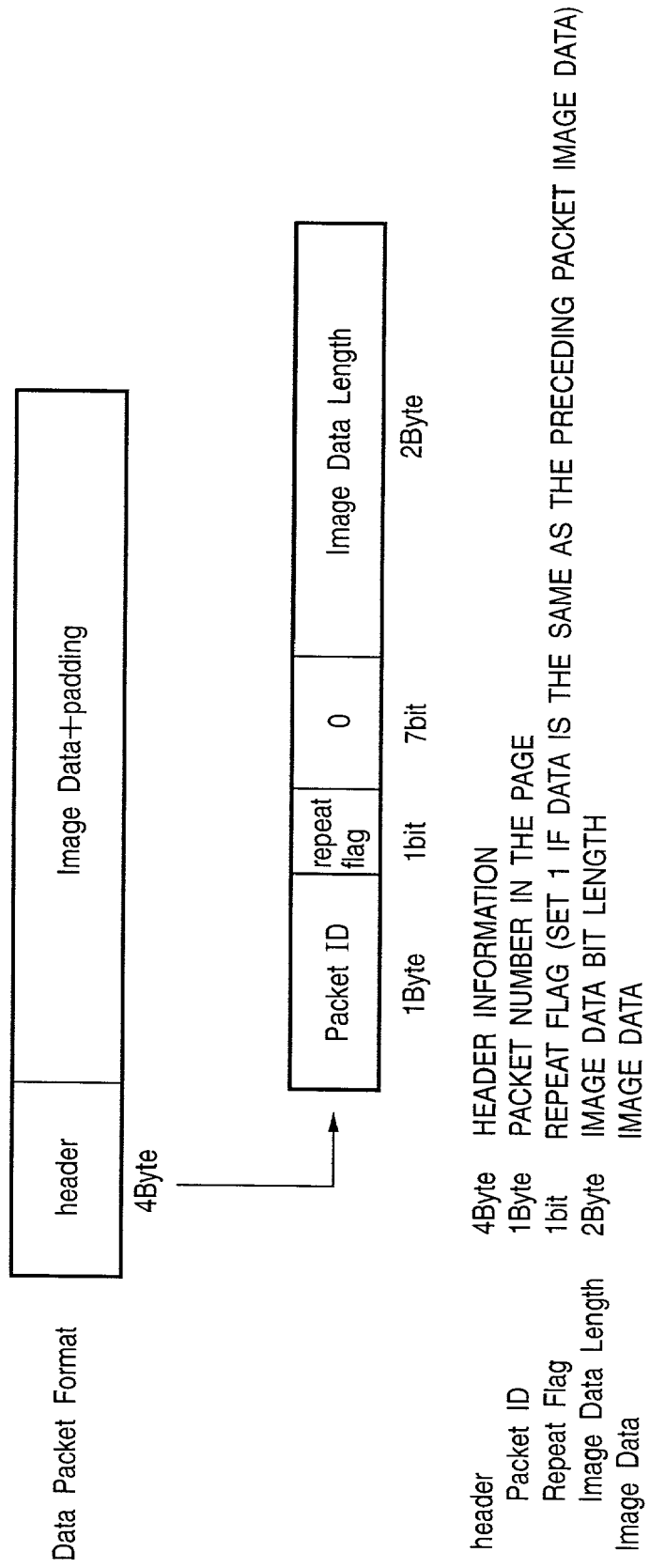
FIG. 2 is a view showing a packet format.

FIG. 2 shows a packet format. Each packet is packed in the form shown in the drawing. A packet is constructed with image data corresponding to a tile having 32×32 pixels, and a header indicative of information regarding the image data. The header includes a packet ID indicative of a packet serial number, a compression flag indicative of whether or not the image data is compressed, and a data length indicative of the image data volume. Note in FIG. 2, since one byte is secured for the packet ID, the number of packets becomes up to 256. In order to handle a larger size of image data, a larger number of bits or bytes may be assigned to the packet ID.

Figure 3:
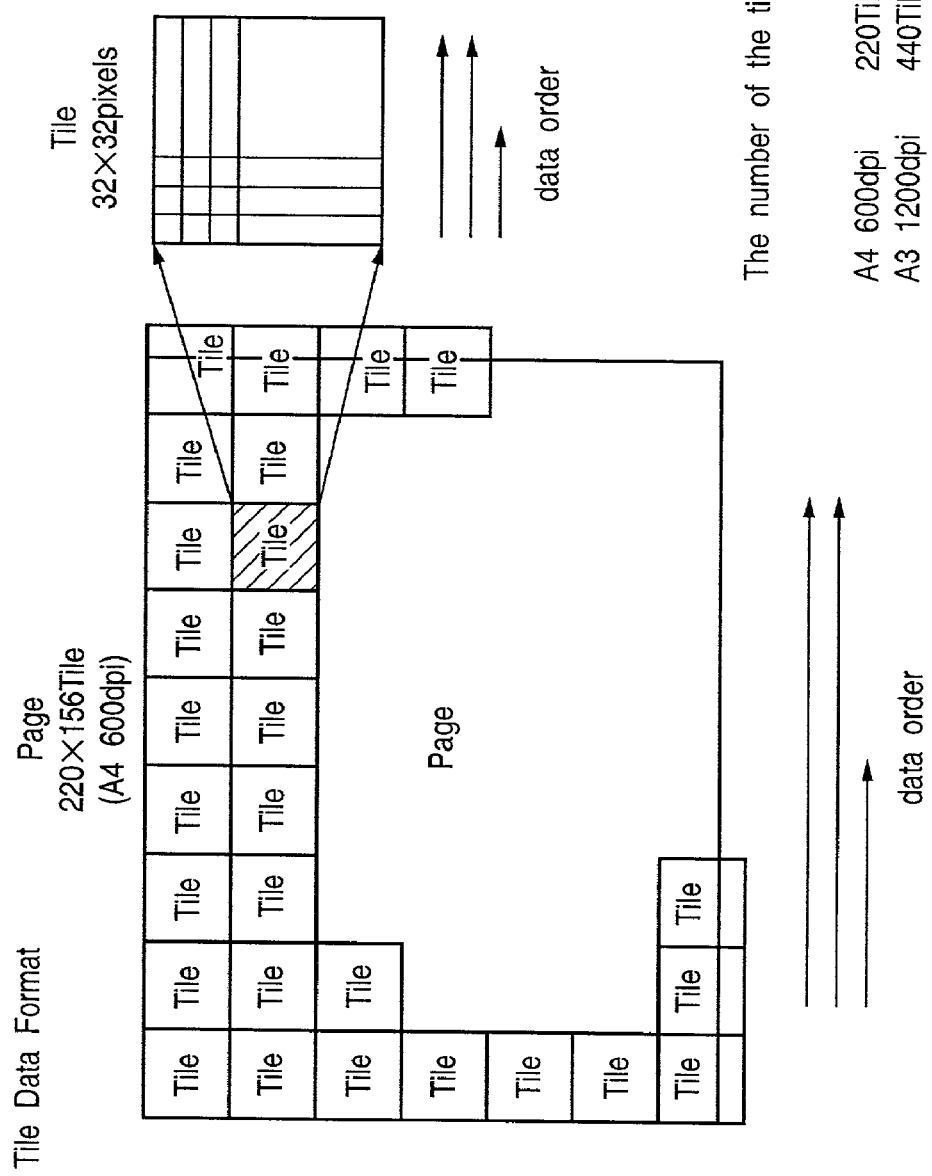
FIG. 3 is a view showing, as an example, image data for one page, divided in tile unit of 32×32 pixels.

FIG. 3 shows image data for one page, divided in tile unit of 32×32 pixels. One page of image is divided in tile unit as shown in the drawing. The tile is constructed with a group of 32×32 pixels. A header is added to the tile of image data, thereby forming a packet. The tile unit does not have to be 32 ×32 pixels, but may be, e.g., 64×64 pixels. Moreover, the tile unit does not need to be a square, but may be a rectangle or the like. When image data is compressed, instead of compressing data for one page altogether, image data in each packet is independently compressed.

Assume herein that image data for one page, stored in a memory, is compressed and packed in unit of 32×32 pixels by software, and the packed image data is stored in another memory area. Further, a packet table is generated in another memory area.

Figure 4:
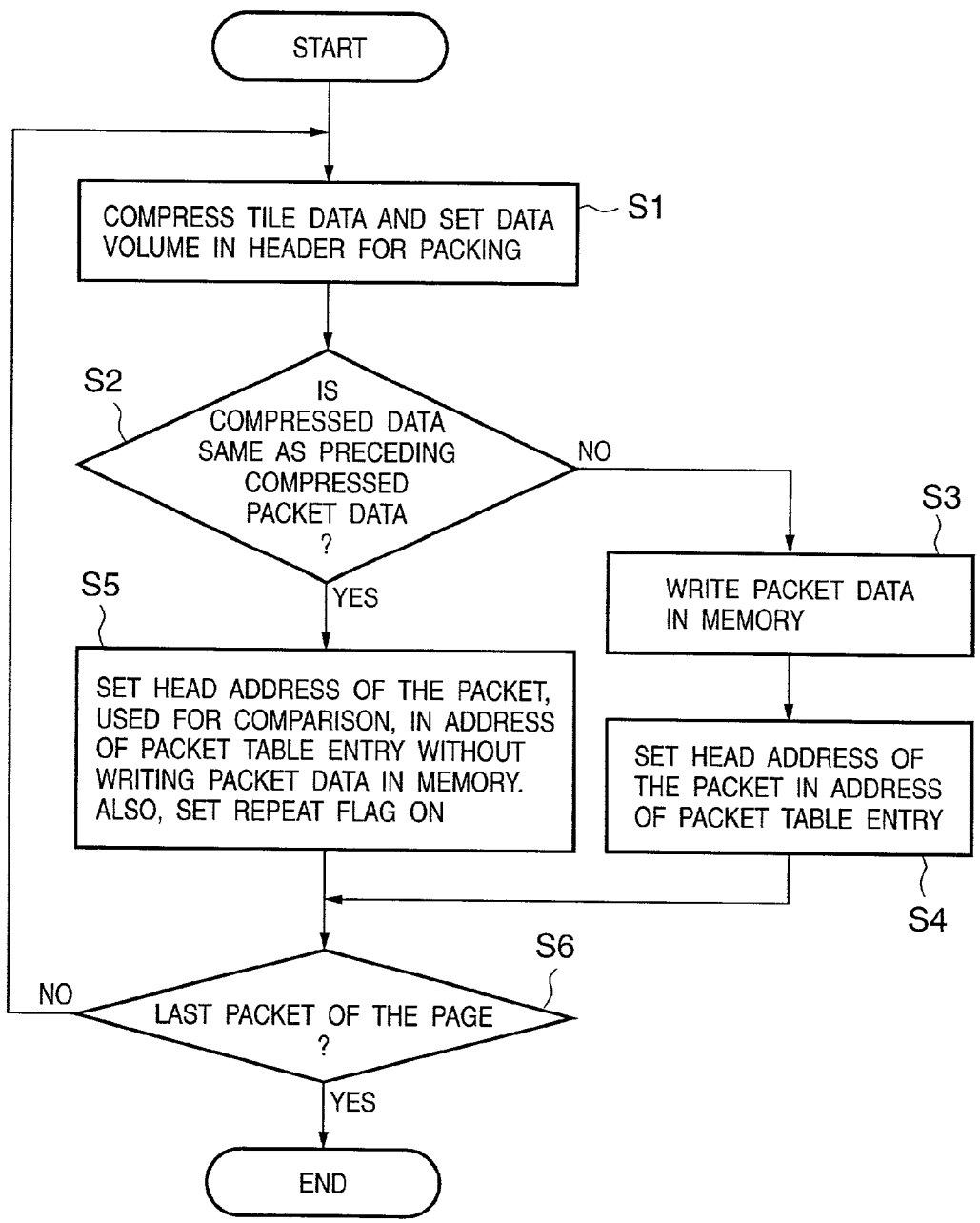
FIG. 4 is a flowchart explaining packing processing.

FIG. 4 is a flowchart showing packing processing.

In step S1, one tile data (32×32 pixels) is obtained from image data subjected to packing, and compression is performed. JPEG or other compression methods may be used for this compression. Then, a header (data volume is also set in the header) is added to the compressed data and packing is performed.

Next, in step S2, it is determined whether or not the compressed data is equal to the preceding packet data. In a case of the first tile data, i.e., Packet ID=1, determination in step S2 is made NO because there is no preceding data, then the control proceeds to step S3.

In step S3, the generated packet data is written in the memory. In step S4, the head address of the memory area where the packet data is written is set in the packet table entry having a corresponding packet ID. At this stage, the repeat flag is set OFF.

In step S6, it is determined whether or not the processing is completed to the end of the page. If NO, the control returns to step S1.

When tile data is packed and stored one by one as described above, there is a case the tile data is equal to the preceding compressed data. This case arises, for instance, when the tile data of interest is in a blank area, e.g., a space between lines. In this case, the determination in step S2 is made YES, and the control proceeds to step S5.

In step S5, the packet data generated for the tile data of interest is not written in the memory, but the head address of the packet, to which comparison is made, is set in a corresponding address of the packet table entry, and the repeat flag is set ON.

When the foregoing processing is repeatedly performed, in a case there are more than two successive tile data having at least the same compressed data, the packet data of the succeeding tile data is not written in the memory. Instead, the address of the packet table for the packet data previously determined as the same is set in the address of the packet table entry, and the repeat flag is set ON.

Note that FIG. 1 shows a case where the compressed data of the fourth tile data (Packet ID=4) is equal to the compressed data of the preceding (the third) tile data (i.e., the address stored in the packet table points the same position).

As described above, according to the first embodiment, although the data volume corresponding to one record is necessary in the packet table for packing one tile data, in the case where image data includes the same compressed data successively, packet data for the succeeding tile data is not necessary. Therefore, the first embodiment is extremely effective in the case of processing, for instance, texts or the like because the data includes a blank area, i.e., space between lines.

Figure 5:
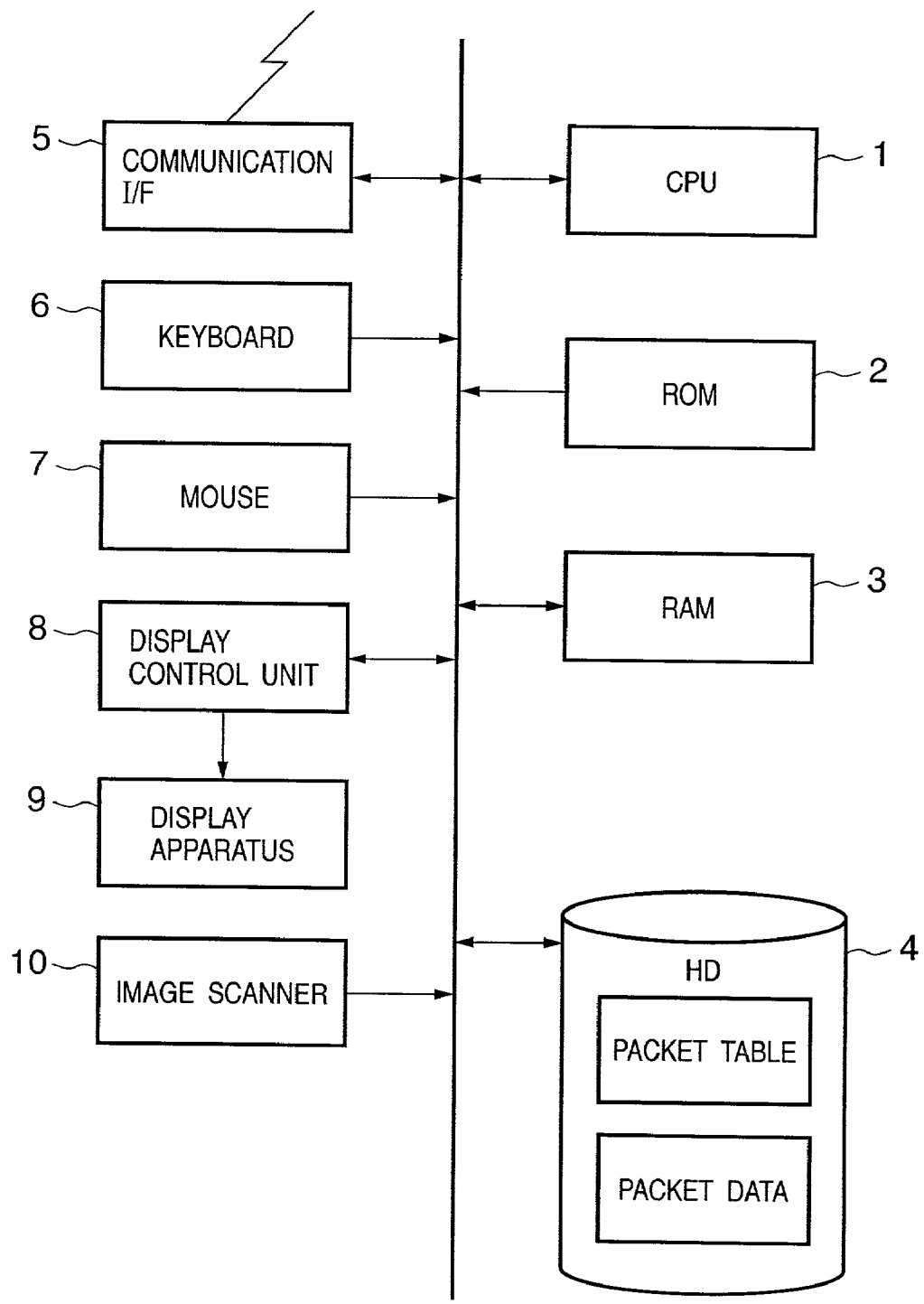
FIG. 5 is a block diagram showing an apparatus according to the first embodiment.

As an apparatus performing the above-described processing, the configuration shown in FIG. 5 is proposed.

In FIG. 5, reference numeral 1 denotes a CPU for controlling the entire apparatus; 2, ROM for storing a boot program or BIOS or the like. Reference numeral 3 denotes RAM, which serves as a work area of the CPU 1, and to which an operating system (OS) and the aforementioned processing program are loaded. Reference numeral 4 denotes a hard disk for storing an OS, files for the aforementioned processing program, and compressed data files (packet table file, packet data). Reference numeral 5 denotes a communication interface for connecting with a network (e.g., intranet, Internet); 6, a keyboard; and 7, a mouse. Reference numeral 8 denotes a display control unit, which controls display operation and includes a display controller and video memory. Reference numeral 9 denotes a display apparatus which performs displaying based on a video signal (image stored in the video memory) from the display control unit 8, and 10 denotes an image scanner.

In the foregoing configuration, when a power of the apparatus is turned on, the OS is loaded from the hard disk 4 to the RAM 3, and an application program for performing the above-described processing is loaded to the RAM 3.

When a user designates an image input on the application program, an image is inputted from the communication interface 5 or image scanner 10, then the processing shown in FIG. 4 is executed, and the image data is stored as a file in the hard disk 4.

The packet table and packet data may be stored as separate files as shown in FIG. 5. However, this makes the file management cumbersome, and may raise a problem of storing the packet table and packet data in different memory. Therefore, these data may be stored as one file. In this case, the file may be constructed with two parts: the first part for the packet table portion and the latter part for the packet data portion. Note that the packet table portion should include an area for storing a byte number indicative of a number the packet data portion starts in the file. However, this area is not necessary if data (e.g., N×M tile image) corresponding to the size of the packet table is stored in the packet table portion to help deriving the head address of the packet data portion. By virtue of managing the packet table and packet data as one file as described above, these data are always handled together, and file management is facilitated.

[Second Embodiment]

Next, the second embodiment of the present invention is described. The second embodiment is an example of applying the present invention to a multi-function apparatus.

Figure 6:
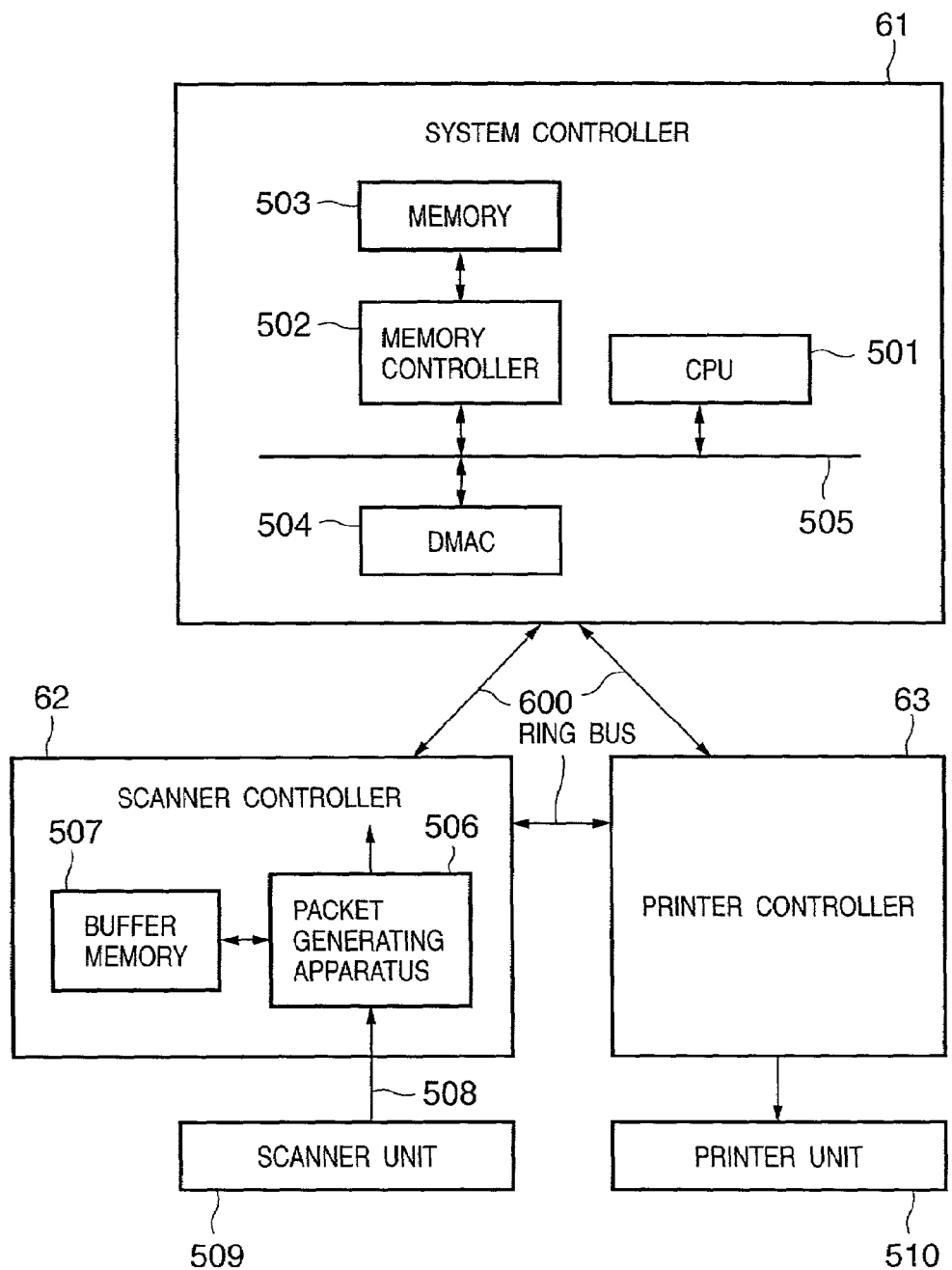
FIG. 6 is a block diagram showing a system according to a second embodiment of the present invention.

Referring to FIG. 6, reference numeral 61 denotes a system controller for controlling the entire apparatus; 62, a scanner controller; 63, a printer controller, all of which are connected by a ring bus 600.

The system controller 61 comprises: a CPU 501, a memory controller 502, memory 503 (RAM or the like), and a DMA controller (DMAC) 504 for performing DMA transfer via the ring bus 600, all of which are connected to the system bus 505. The printer controller 63 receives image data edited by the system controller 61, or raw data from the scanner controller 62, and have a printer unit 510 perform printing. The scanner controller 62 comprises: buffer memory 507, packet generating apparatus 506, and an input port 508 for inputting data from a scanner unit 509. The scanner controller 62 controls the scanner unit 509, packs image data obtained by reading an original document, and outputs the packed image data to the system controller 61 or printer controller 63.

Data flow in the above-described configuration is explained below.

When the scanner controller 62 receives a command to read an original document from the system controller 61, the scanner controller 62 drives the scanner unit 509 to read the original document.

Then, the scanner controller 62 compresses the image data, read by the scanner unit 509, in tile unit of 32×32 pixels, generates packet data as well as a packet table in the buffer memory 507, and DMA-transfers the result to the system controller 61.

Figure 7:
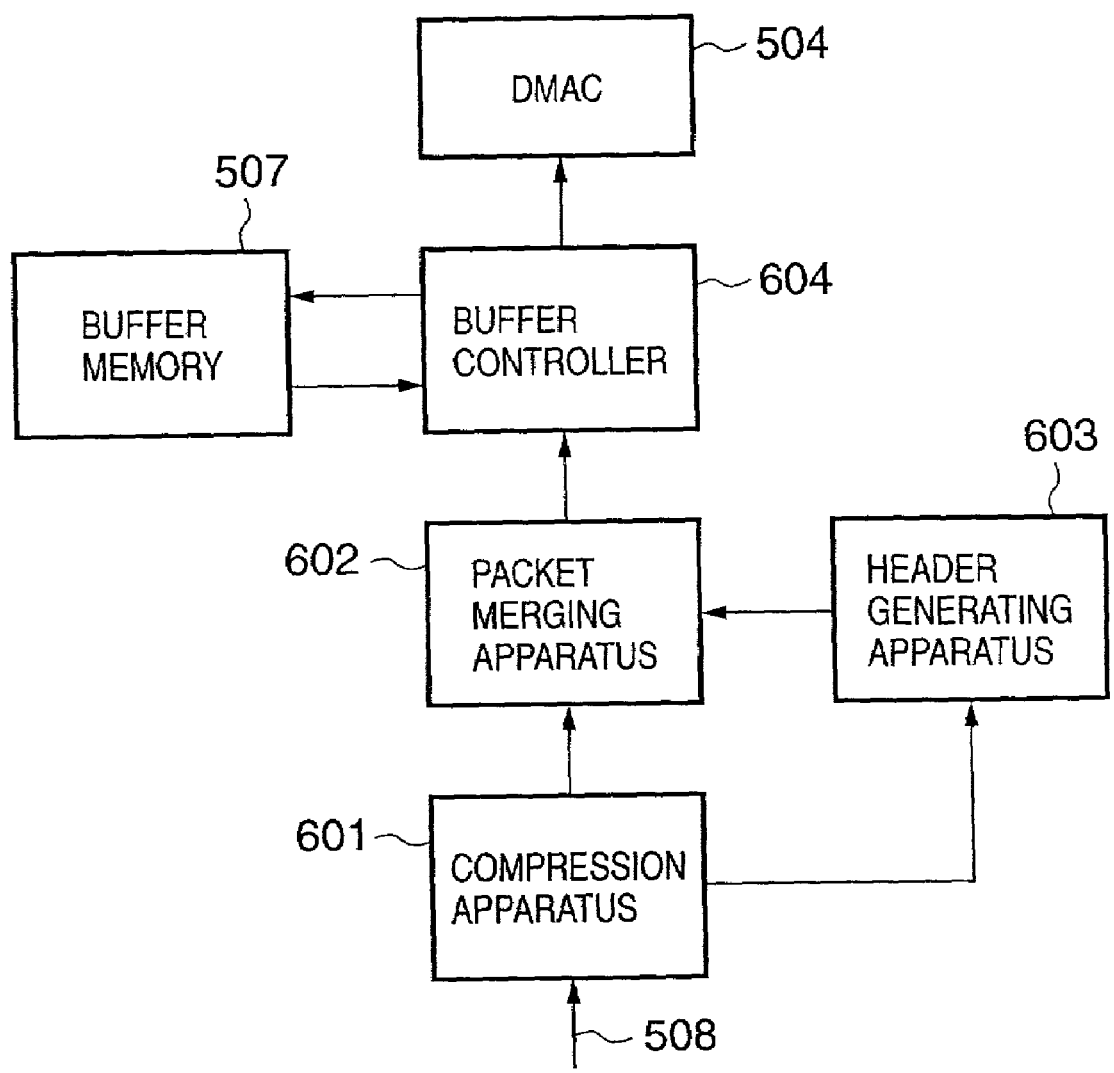
FIG. 7 is a block diagram showing a packet generating apparatus 506.

FIG. 7 is a block diagram mainly showing a packet generating apparatus 506. Reference numeral 601 denotes a compression apparatus for compressing image data, inputted from the image input port 508, in tile unit of 32×32 pixels; 603, a header generating apparatus for generating a packet header; 602, a packet merging apparatus for merging the header with the compressed image data and generating a packet; and 604, a buffer controller for storing a packet in the buffer memory, or comparing a packet transmitted from the packet merging apparatus 603 with packet data in the buffer memory.

First, image data is transmitted from the image input port 508 in tile unit of 32×32 pixels. The compression apparatus 601 compresses the image data, transmits the compressed data to the packet merging apparatus 602, and informs the header generating apparatus 603 of the data volume of the compressed data. The header generating apparatus 603 performs serial numbering of packet ID, and stores the data length in the image data bit length. The packet merging apparatus 602 merges the image data from the compression apparatus 601 with the header data from the header generating apparatus 603, thereby generating a packet. The packet is transmitted to the buffer controller 604. The buffer controller includes a buffer flag indicative of whether or not packet data is currently stored in the buffer memory. If the buffer flag is ON, it indicates that a preceding packet exists in the buffer memory 507 and that the volume of the packet is equal to or smaller than a predetermined volume. Assume herein that the capacity of the buffer memory 507 is 256 bytes. A packet having a volume larger than 256 bytes is not stored in the buffer memory 507, and the buffer flag is set OFF. Herein, the capacity of the buffer memory 507 and a threshold value for turning on the buffer flag are set in a value smaller than the packet image data before compression. In this manner, a packet having a volume larger than a predetermined volume is not stored in the buffer memory and excluded from comparison. When packets having the same data continuously exist, the image data is often a white space such as a white background. In the case of compressing such data, an excellent compression rate is expected. In other words, a packet having a large volume is not likely to have the same data as a preceding packet even if comparison is performed. Adopting this idea, a packet having a large volume is excluded from data comparison.

When the buffer controller 604 receives packet data from the packet merging apparatus 602, if the volume of the packet is equal to or smaller than 256 bytes and the buffer flag is ON, the buffer controller 604 compares the received packet data with the packet data in the buffer memory 507, sequentially from the top. When data match is found for the entire volume of the packet, the image data is extracted from the packet and the header only is sent to the DMAC 504, with the repeat flag of the packet header ON. Meanwhile, when data disagreement is found in the middle of the comparison, starting therefrom, the packet data is newly stored in the buffer memory 507. When the entire packet is stored, the buffer controller 604 reads the packet from the head of the buffer memory 507, and sends the packet to the DMAC 504. Meanwhile, when the buffer controller 604 receives packet data from the packet merging apparatus 602, if the volume of the packet is larger than 256 bytes, the buffer controller 604 sets the buffer flag OFF and directly transmits the packet to the DMAC 504 without storing the packet in the buffer memory 507. The DMAC 504 writes the received packet in the memory. The DMAC 504 comprises a packet address register for indicating an address where packet data is stored, and a packet table address register for indicating an address where a packet table is stored. This packet table does not need to be stored in the memory, but may be stored in the register. When the repeat flag of a received packet is OFF, the packet data is written in an address designated by a packet address register. In addition, the address designated by the packet address register is written in an address designated by a packet table address register. The volume corresponding to the packet is added to the packet address register, and 4 bytes corresponding to one entry of the packet table are added to the packet table address register. Upon completion of this processing, the DMAC 504 receives the next packet.

When the repeat flag of the next packet is ON, the packet data is not written in the memory, but the preceding entry in the packet table is copied to the address designated by the packet table address register, and the repeat flag of the preceding entry is set ON. No change is added to the packet address register. 4 bytes corresponding to one entry of the packet table are added to the packet table address register. Upon completion of this processing, the DMAC 504 receives the next packet.

By virtue of employing the above-described method of data transfer from the scanner controller 62 to the system controller 61, the load on the ring bus 600 is reduced.

The system controller 61 performs various editing processing on the data sent by the scanner controller 62, and outputs the data to the printer controller 63 for printing processing.

In a case of a digital copying machine, the aforementioned system controller 61, scanner controller 62, and printer controller 63 may be constructed in one semiconductor substrate. However, it is preferable to construct each device in an independent semiconductor substrate so as to be applicable to an improved function of each device.

In the second embodiment also, a packet table and packet data may be stored as one file.

Furthermore, the present invention can be applied to a system constituted by a plurality of devices or to an apparatus comprising a single device.

Further, the object of the present invention can also be achieved by providing a storage medium (or recording medium), storing program codes for a software realizing the functions of the foregoing first and second embodiments, to a computer system or apparatus, reading the program codes, by a computer (CPU or MPU) of the system or apparatus, from the storage medium, then executing the program. In this case, the program codes read from the storage medium realize the functions according to the embodiments, and the storage medium storing the program codes constitutes the present invention.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, the foregoing embodiments are effective in a case where packets having the same data continuously exist in image data because the packet data need not be stored in the memory, and thus the amount of memory usage can be reduced. In the case of text data having a white background or the like, it is highly likely that packets continuously have the same data. Therefore, actually a large effect can be expected in reduction of the amount of memory usage.

Furthermore, according to the second embodiment, comparison of data contents is not performed on a packet having a large volume, but is performed only on a packet having a small volume. This can save the time for comparison, and can reduce the amount of buffer memory necessary for storing a packet subjected to comparison. Furthermore, according to the second embodiment, when a match is found between packet data, data transfer to the DMAC is not performed but only the header is transferred. By virtue of this, the amount of transferring data can be reduced, and actual data transfer speed is improved.

As described above, the present invention realizes efficient compression of image data, storage and management of the image data.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for compressing and storing image data, comprising:
   a division unit, adapted to divide the image data into pixel blocks, each pixel block being a group of a predetermined number of pixels;
   a compression unit, adapted to compress the pixel blocks divided by the division unit;
   a generating unit, adapted to generate packets of data, each of which corresponds to a pixel block compressed by the compression unit and includes a header indicative of information regarding the pixel block;
   a storage unit, adapted to store the packets of data and a packet table indicating a storage address of each pixel block corresponding to each packet generated by the generating unit;
   a setting unit, adapted to set information, indicating whether a second pixel block corresponding to a packet of interest is different from a first pixel block corresponding to a preceding packet, into the header of the packet of interest; and
   a storage control unit, adapted to store the second pixel block as a part of the packet of interest and store a storage address of the packet of interest in the packet table in a case where the header of the packet of interest indicates that the second pixel block is different from the first pixel block, whereas in a case where the header of the packet of interest indicates that the second pixel block is equal to the first pixel block, not storing the second pixel block, but storing in the packet table a storage address of the preceding packet as a storage address of the packet of interest.

2. The image processing apparatus according to claim 1, wherein the first pixel block immediately precedes the second pixel block.

3. The image processing apparatus according to claim 1, wherein the packets of data generated by the generating unit and the packet table are stored in the storage unit as one file.

4. The image processing apparatus according to claim 1, wherein the packet table includes a flag indicative of whether or not to refer to an address of another packet as a storage destination of a packet corresponding to the pixel block of interest.

5. An image processing method of compressing and storing image data, comprising:
   a division step, of dividing the image data into pixel blocks, each pixel block being a group of a predetermined number of pixels;
   a compression step, of compressing the pixel blocks divided in the division step;
   a generating step, of generating packets of data, each of which corresponds to a pixel block compressed in the compression step and includes a header indicative of information regarding the pixel block;
   a setting step, of setting information, indicating whether a first pixel block corresponding to a preceding packet is different from a second pixel block corresponding to a packet of interest, into the header of the packet of interest; and
   a storage step, of storing the second pixel block as a part of the packet of interest and a storage address of the packet of interest in a storage unit in a case where the header of the packet of interest indicates that the second pixel block is different from the first pixel block, whereas in a case where the header of the packet of interest indicates that the second pixel block is equal to the first pixel block, not storing the second pixel block, but storing in the storage unit a storage address of the preceding packet as a storage address of the packet of interest.

6. A computer program embodied in a computer-readable medium which, when executed, performs an image processing method of compressing and storing image data, comprising code for performing the following steps
   a division step, of dividing the image data into pixel blocks, each pixel block being a group of a predetermined number of pixels;
   a compression step, of compressing the pixel blocks divided in the division step;
   a generating step, of generating packets of data, each of which corresponds to a pixel block compressed in the compression step and includes a header indicative of information regarding the pixel block;
   a setting step, of setting information, indicating whether a first pixel block corresponding to a packet of interest is different from a second pixel block corresponding to a preceding packet, into the header of the packet of interest; and
   a storage step, of storing the second pixel block as a part of the packet of interest and a storage address of the packet of interest in a storage unit in a case where the header of the packet of interest indicates that the second pixel block is different from the first pixel block, whereas in a case where the header of the packet of interest indicates that the second pixel block is equal to the first pixel block, not storing the second pixel block in the storage unit, but storing in the storage unit a storage address of the preceding packet as a storage address of the packet of interest.

7. The image processing apparatus according to claim 1, further comprising a buffer unit adapted to store the first pixel block,
   wherein the setting unit sets the information into the header of the packet of interest by comparing the second pixel block with the first pixel block stored in the buffer unit.

8. The image processing apparatus according to claim 7, wherein said buffer unit stores the second pixel block as the first pixel block in a case where a data amount of the second pixel block is less than a predetermined amount, and said buffer unit does not store the second pixel block in a case where the amount of the second pixel block is equal to or more than the predetermined amount.

9. The image processing apparatus according to claim 8, wherein, if the first pixel block is not stored in the buffer unit, the setting unit sets the information, indicating that the first pixel block is different from the second pixel block, into the header of the packet of interest.

10. The image processing method according to claim 5, wherein the first pixel block immediately precedes the second pixel block.

11. The image processing method according to claim 5, wherein the packets of data generated in the generating step and a packet table indicating a storage address of each pixel block corresponding to each packet, are stored in the storage unit as one file.

12. The image processing method according to claim 5, wherein a packet table including a flag indicative of whether or not to refer to an address of another packet as a storage destination of a packet corresponding to the pixel block of interest, is stored in the storage unit.

13. The image processing method according to claim 5, further comprising a buffering step of storing the first pixel block in a buffer, wherein the setting step includes setting the information into the header of the packet of interest by comparing the second pixel block with the first pixel block stored in the buffer.

14. The image processing method according to claim 13, wherein the second pixel block is stored in the buffer as the first pixel block in a case where a data amount of the second pixel block is less than a predetermined amount, and the second pixel block is not stored in the buffer in a case where the amount of the second pixel block is equal to or more than the predetermined amount.

15. The image processing method according to claim 14, wherein, if the first pixel block is not stored in the buffer, the information indicating that the first pixel block is different from the second pixel block is set into the header of the packet of interest.

16. The computer program according to claim 6, wherein the first pixel block immediately precedes the second pixel block.

17. The computer program according to claim 6, wherein the packets of data generated in the generating step and a packet table indicating a storage address of each pixel block corresponding to each packet, are stored in the storage unit as one file.

18. The computer program according to claim 6, wherein a packet table including a flag indicative of whether or not to refer to an address of another packet as a storage destination of a packet corresponding to the pixel block of interest, is stored in the storage unit.

19. The computer program according to claim 6, further comprising a buffering step of storing the first pixel block in a buffer, wherein the setting step includes setting information into the header of the packet of interest by comparing the second pixel block with the first pixel block stored in the buffer.

20. The computer program according to claim 19, wherein the second pixel block is stored in the buffer as the first pixel block in a case where a data amount of the second pixel block is less than a predetermined amount, and the second pixel block is not stored in the buffer in a case where the amount of the second pixel block is equal to or more than the predetermined amount.

21. The computer program according to claim 20, wherein, if the first pixel block is not stored in the buffer, the information indicating that the first pixel block is different from the second pixel block is set into the header of the packet of interest.

* * * * *

UNITED STATES PATENT AND TRADEMARK OFFICE
CERTIFICATE OF CORRECTION

PATENT NO. : 6,992,788 B2
APPLICATION NO. : 09/927539
DATED : January 31, 2006
INVENTOR(S) : Takafumi Fujiwara It is certified that error appears in the above-identified patent and that said Letters Patent is hereby corrected as shown below:

<u>COLUMN 8</u>

Line 26, "steps" should read --steps:--.

Signed and Sealed this

Twenty-first Day of November, 2006

JON W. DUDAS
*Director of the United States Patent and Trademark Office*